April 18, 1944.    M. J. MANJOINE ET AL    2,346,981
TENSILE MACHINE
Filed Dec. 5, 1940
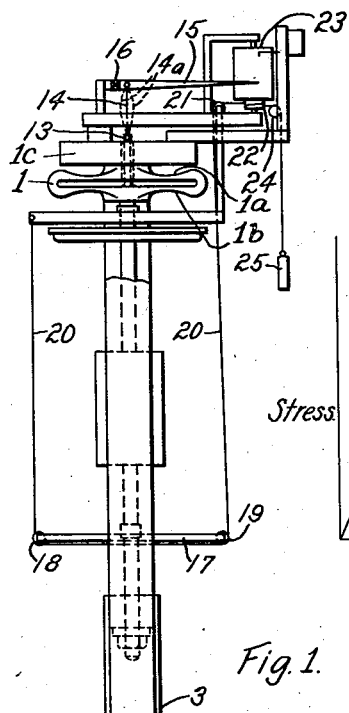
Fig. 1.
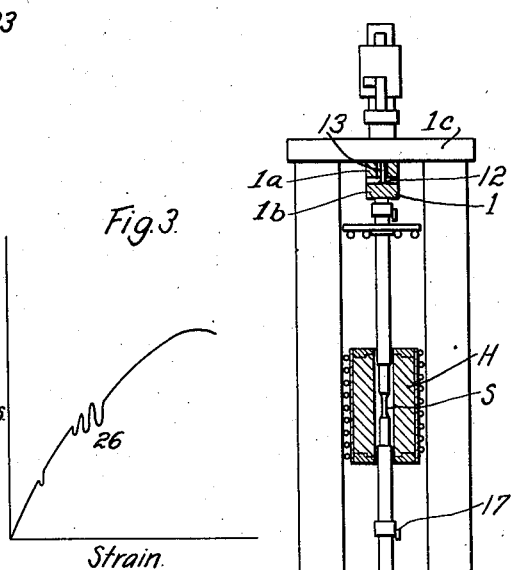
Fig. 3.
Fig. 2.
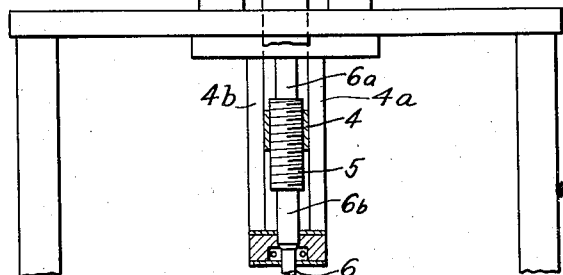
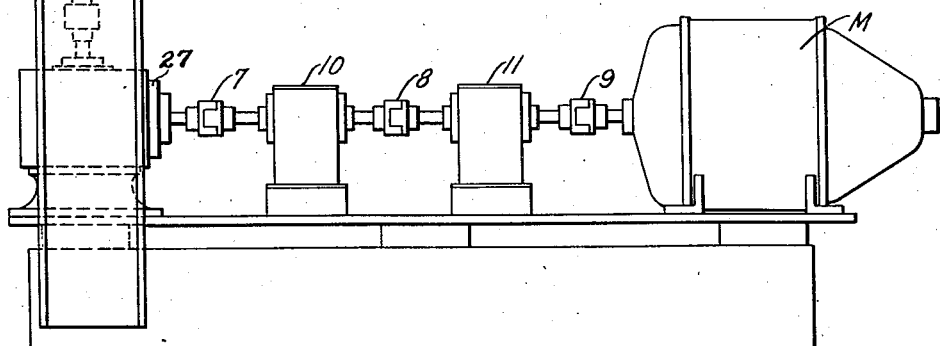
WITNESSES:
INVENTORS
Arpad Nadai and
Michael J. Manjoine.
BY
ATTORNEY Patented Apr. 18, 1944

2,346,981

UNITED STATES PATENT OFFICE 2,346,981

TENSILE MACHINE

Michael J. Manjoine, Pittsburgh, and Arpad Nadai, Wilkinsburg, Pa., assignors to Westinghouse Electric & Manufacturing Company, East Pittsburgh, Pa., a corporation of Pennsylvania Application December 5, 1940, Serial No. 368,602

10 Claims. (Cl. 265—2)

Our invention relates to a tension machine suitable for securing stress-strain recordings of materials at controlled and adjustable rates of stretching and at elevated temperatures.

Little is known about the forces required to deform the ductile metals at rates of straining, which are considerably higher than those which are usually applied in the commercial machines available for the testing of materials.

The dependence of the stresses on the rates of straining is of fundamental importance for the evaluation of the steels which are used at high temperatures in steam and gas turbines and in highly stressed containers. Since at the operating temperatures of 450° to 550° C. encountered in steam boilers and steam or gas turbines, the steels "creep" i. e. slowly deform permanently under stress, all machine parts exposed to these high temperatures must be designed so that the permissible creep during service time does not exceed a certain value. The determination of this creep resistance of a metal makes it frequently necessary to run very expensive longtime creep tests, which last several months.

An object of our invention is to provide a simple machine in which the time of testing is but a very small fraction of the time which is otherwise required for running of the standard longtime creep tests. Since the resistance to deformation of a metal at high temperatures is very dependent on the rates of straining, a few rapid tests made under controlled but much faster rates than those which are encountered at the extremely slow rates of straining in the creep range may serve to predict the creep resistance of the stable metals.

Our earlier filed copending application, Serial No. 345,098, filed July 12, 1940, and entitled "High velocity tensile machinery" is mainly designed for investigating the dependence of stress on the rate of straining at the very highest velocities which are of interest to industry, while our present invention is provided for much slower strain rates which, however, are still much faster than those at which usual prior art commercial testing machines can operate. The present machine thus fills a gap in the investigation of creeping of metals or other material.

An object of our invention is to provide a tension machine in which a very wide range of strain rates can conveniently be produced. Since the "speedlaw" connecting stress with rated strain is of a logarithmic nature when the strain rates vary according to a geometric progression such as 1:2:4:8:16, etc., or 1:10:100:1000, etc., the corresponding stresses will be found to vary much slower, perhaps according to an arithmetic progression such as 1, 1.01, 1.02, 1.03, . . . etc. It becomes, therefore, essential to have apparatus available in which the strain rates can be varied perhaps in the proportion $1:10^6$. This cannot be attained in ordinary testing machines, which are much too slow for this purpose and entirely inadequate for recording of stress strain curves at the high rates of straining here under consideration. The essential object of our invention is the automatic recording of stress strain curves or of the first parts of these latter curves in a magnified scale.

Another object of our invention is to provide a recording mechanism without elastic hysteresis, capable of recording the tension force during a rapid deformation without much distortion through inertia forces, which is unaffected by the breakage of the specimen, therefore, which needs not to be disconnected from the system just before the test bar breaks and which is capable for example also to reveal and to record truthfully and without distortion the regular fine oscillations of the load corresponding to the discontinuous manner in which some metals yield due to internal slippage of the grains or the formation of slip layers.

Another object of our invention is to provide the faster rates of stretching, which could not be achieved in the ordinary testing machines without distortion through inertia forces or without endangering the construction.

Other objects and advantages will become more apparent from a study of the following specification when considered in conjunction with the accompanying drawing, in which:

Figure 1 is a front view of a tensile machine embodying the principles of our invention;

Fig. 2 is a partial lateral view partially in cross section of the device shown in Fig. 1;

Fig. 3 shows a typical stress-strain curve for a specimen which has discontinuous yielding properties.

In the past various types of tensile machines have been produced with the objective of providing an accurate stress-strain curve recording.

These objectives as far as we are aware have never been completely achieved for specimens up to the breaking point of the specimen. For instance, in the pendulum manometer types of machines, accentuated vibrations are obtained by the pendulum during discontinuous yielding of the specimen, thereby giving inaccurate stress-strain characteristics. Similarly in the case of machines using hydraulic systems, changes in the size of openings of the valve introduce errors such as not to give constant strain rates. In a like manner, in the dropping beam type of machine errors are introduced at the moment of dropping of the beam due to dynamic effects and to the absence of a state of equilibrium. A stress-strain characteristic is then obtained which inaccurately denotes the stress as being of a greater value than its actual value during the yield of the specimen which yield effected the dropping of the beam.

Furthermore, the ordinary drive for a tensile machine, in the past, has been a worm gear drive in which a screw is moved vertically as the result of such worm gear drive. However, such system has the inherent disadvantage in that it is incapable of effecting high stretching rates, say, for example, a half inch per second movement of the spindle, which is desirable for certain tests.

In accordance with our invention we have overcome all the above-mentioned disadvantages by providing a machine which will give accurate recordings of stress-strain characteristics for wide selective values of stretching rates and which the recording mechanism need not be disconnected from the system when the specimen is about to break, since such recording mechanism is inherently immune from any rupturing or destructive tendencies produced as a result of breakage of the specimen.

Referring more particularly to Figs. 1 and 2 of the drawing, S denotes a specimen (or test bar) which has its upper end rigidly secured to the bottom of the force measuring device 1 and its lower end connected to a collar 2 formed on the upper end of a bifurcated connecting member 3. The connecting member 3 is adapted to be forced downwardly by a collar or nut portion 4 connected to the lower end thereof which is in screw threaded engagement with a threaded shaft portion 5 integrally formed on the motor drive shaft 6, and which is kept from turning by sliding along a pair of oppositely disposed guide members 4a and 4b. Surrounding specimen S is an electric resistance furnace H for heating the specimen to any required temperatures.

The motor M drives the drive shaft 6 through a plurality of universal couplings 7, 8 and 9 and through a plurality of speed reduction gears represented by numerals 10 and 11 and a vertical gear reducer 27. For slow speed operation such drive is effective to propel the nut portion 4 downwardly, thereby transmitting a stretching force to the specimen S. For high stretching rates, however, speed reduction gears 10 and 11 are unnecessary and if desired, a selective transmission system, such as used in automobiles, may be substituted therefor, so that it will be possible to obtain either direct drive of shaft 6 by the motor or any selective reduced speed drives. Friction drives may also be used. Direct current variable speed motors or motor generator sets or other such speed controlling devices well known in the art may be substituted. When the shaft 6 is driven directly by the motor, the rate of downward propelling motion of nut 4 is very rapid; hence special precautions must be provided for avoiding breakage of the spindle or other parts of the machine in case of overtravel of the nut. In order to provide such a feature, we have reduced the diameter of the shaft portions 6a and 6b, immediately above and below the threaded shaft portion 5, so that in the event of overtravel, the nut 4 will travel off the threaded shaft portion 5 and will thereafter be ineffective to stretch the specimen any further. Of course, limit switches at these points may be provided (not shown) which can effectively interrupt the motor energizing circuit. Also, as a substitute or additional safety feature, we may include in the motor energizing circuit any suitable timing mechanism which will interrupt the motor after the lapse of a predetermined time interval.

In its preferred form, the force measuring device 1 is made of special carefully selected steel and has a ring-like structure having a flattened O shape providing similar upper and lower portions 1a and 1b which are integrally connected. This construction provides sufficient elasticity and rigidity without using much space and at the same time allows an appreciable vertical deflection in proportion to the force applied at the bottom portion thereof. The cross section of the flattened O shaped device 1 is non-uniform, as shown for the purpose of distributing evenly the bending strain along the device 1. As pointed out above, the lower portion 1b of the force measuring device is connected to the test bar S. The upper portion 1a is secured to a beam 1c constituting a part of the supporting structure. Due to this construction of the measuring device 1, a downward force applied to the specimen will deflect or deform the portions 1a and 1b an amount proportional to the applied force. To measure such deflection, there is integrally secured (preferably welded) to point 12 of the portion 1b, a pin 13 which has its upper end connected to one end of a thin wire 14 such as a piano string, which wire 14 has its other end secured to a lever 15 having a flexible frictionless pivot 16.

By reason of the shape of the device 1, and particularly the identical upper and lower portions 1a and 1b, it will be seen that deflection imparted to the device 1 will result in a straight line movement in a vertical direction of the pin 13. It will also be noted that the particular form of force measuring device provides a beam-like construction in which the portions 1a and 1b comprise beams connected at their ends to which the deforming force is applied centrally thereof.

The pivot 16 comprises two flat springs which are disposed at right angles to each other but which are unconnected to each other, for providing a frictionless and yieldable pivot and which will, at all times bias lever 15 towards its horizontal position, as shown. Vertical movement of the lever 15 will, therefore, denote the force applied to bar 1 by virtue of the stretching effect imposed upon the specimen by the motor drive. In order to provide a device which is responsive to strain of the specimen, a bar 17 is rigidly secured to the lower portion of the specimen (or to an element rigidly secured to such lower portion), which bar has small pulleys 18 and 19 pivoted at its ends around which are entrained a fine piano wire 20, which piano wire is thereafter wrapped around another pulley 21 and then about a sleeve portion 22 of the recording drum 23, finally going around another pulley 24 and ending by a connection to a weight 25 for maintaining the string taut. Such method of measuring strain is well known and in and of itself forms no part of our present invention.

Since the piano wire 20 traverses the length of the specimen twice, the change in length of the specimen as a result of stretching thereof will be magnified by a factor of 2. Of course, by traversing the specimen a greater number of times, a greater amplification factor may be secured. It will, therefore, be seen that the recording drum 23 is rotated in proportion to the elongation of the specimen, so that a suitable pencil at the end of lever 15 by its engagement with a waxed surface recording drum will give a stress-strain curve, such as shown in Fig. 3.

If the specimen is made of a material which exhibits discontinuous yielding, such as indicated at part 26 in Fig. 3, it is highly important that the natural frequency of the recording mechanism be high enough to accurately follow the yielding forces of the specimen. For example, the yielding of mild steel may produce a yielding velocity comparable to a vibration of 10 cycles per second, in which case we should have a recording system having a natural frequency which is greater than 10 cycles per second and preferably from 2 to 5 times as great, say, for example, of about 40 cycles per second. Therefore, a recording mechanism which is rather rigid and rugged in construction having a comparatively high natural frequency would be entirely unsuitable since it cannot follow such discontinuities. On the other hand, recording devices as used in the prior art, while generally of sufficiently low natural frequency, to follow such discontinuities, have had the outstanding disadvantage that such delicate mechanisms were subject to breakage as the result of high frequency vibration produced following breakage of the specimen.

For instance, following breakage of the specimen the force measuring device 1 and the pin 13 rigidly connected thereto will inherently vibrate at a high frequency, say about 400 cycles per second. If there were a direct coupling of pin 13 to lever 15, the recording mechanism would be unable to follow these high frequency vibrations with the result that the system would yield, presumably at the point of connection to lever 15, and would destroy the calibration and perhaps break some delicate part of the system. In order to overcome this difficulty, we have provided a thin wire 14 which is biased upwardly by virtue of the flexible pivot 16. In the event of breakage of the specimen, wire 14 would merely bow or deflect as indicated by the dotted curves 14a, and the vibrations within the confines of the dotted curves would prevent the transmission of high frequency forces to lever 15, and hence will avoid the transfer of any disruptive high frequency forces to the recording system.

In our copending application above referred to, the device was particularly built for the fastest rates of stretching (strain rates of the order of 100 to 1000 per second with a time for running the tension tests being between $\frac{1}{100}$ and $\frac{1}{1000}$ of a second). For testing the creep properties of steels used in steam and gas turbines, in rapid constant strain rate tests, we found that it is convenient to run tension tests in a range of rates of the order of $10^{-6}$ (100% elongation in $10^6$ seconds equivalent to 278 hours or 11 days) to 1 per second (100% elongation in one second). It is, therefore, obvious that we have produced a tensile machine which is satisfactory for very rapid as well as very slow tension tests at either high or room temperatures of the specimen, making it very flexible and suitable for tests of a wide variety of types of specimen at a wide variety of temperatures thereof, so that careful and detail studies of the properties of metals under various temperatures and at various constant strain rates may be made. Metals or other materials may, therefore, be accurately compared for strength under the same temperature conditions and under the same constant stretching rates. Furthermore, we have produced a device which will accurately record the stress-strain characteristics all the way up to the breaking point of the specimen without endangering the recording mechanism.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims.

We claim as our invention:

1. A machine for applying a force to a specimen at a rapid rate including a driving motor, a shaft driven thereby having a threaded portion, a force measuring device, a connecting member for transmitting a force to the specimen and force measuring device including a nut engaging said threaded shaft portion whereby movement may be imparted to the nut by rotation of said shaft, said shaft having portions of reduced diameter adjacent the ends of its threaded portion so as to disconnect said device in the event of overtravel of the nut.

2. A machine for stretching a specimen at a rapid rate, including a driving motor, drive means for transmitting a stretching force to said specimen by said motor, a force measuring device comprising a beam-like structure deflectable an amount proportional to the force applied thereto and having a natural frequency of a multiple of the shortest test period to be applied to the specimen, means connecting said specimen to a part of said structure, means rigidly supporting another part of said structure in such manner that the force applied to said specimen will be effective to deflect said beam-like structure, a force indicating means having a part movable in accordance with the deflection of said beam-like structure for indicating the force applied thereto, said indicating means having a lower natural frequency than said device, and a unidirectional mechanical transmission connecting said beam-like structure and said movable indicating part so as to impart movement to such part upon deflection of said beam-like structure in only one direction.

3. A machine for stretching a specimen at a rapid rate, including a driving motor, drive means for transmitting a stretching force to said specimen by said motor, a force measuring device comprising a beam-like structure deflectable an amount proportional to the force applied thereto, means connecting said specimen to a part of said structure, means rigidly supporting another part of said structure in such manner that the force applied to said specimen will be effective to deflect said beam-like structure, a force indicating means having a part movable in accordance with the deflection of said beam-like structure for indicating the force applied thereto, a string-like element having one end directly connected to said beam-like structure and its other end operatively engaged with said force indicating part, said string-like element being effective to impart movement to said part upon deflection of said beam-like structure in one direction but ineffective to impart movement thereto upon deflection of said structure in an opposite direction.

4. A machine for stressing a specimen to be tested comprising means for applying a loading force to the specimen, a force measuring device comprising a member having a flattened O shape to provide two beam-like structures connected at their ends, mounting means for said member comprising a connection centrally of one of said beam-like structures to said specimen, and a connection centrally of the other of said structures for rigidly supporting said member, said mounting means being effective to subject said device to the force applied to said specimen and to deflect said structures an amount proportional to said force, a force indicating means having a part movable in accordance with the deflection of said structures for indicating the force applied to said specimen, and a unidirectional mechanical transmission connecting said one beam-like structure and said part effective to impart movement to said part upon deflection thereof in one direction but ineffective to impart movement to said part upon a deflection in an opposite direction.

5. A machine for stressing a specimen to be tested comprising means for applying a loading force to the specimen, a force measuring device deflectable an amount proportional to the force applied thereto and having a natural frequency of the order of five to ten times as compared with the shortest available test period, a connection for subjecting said device to the force applied to said specimen, a force indicating means having a part movable in accordance with the deflection of said device for indicating the force applied thereto and having a low frequency of vibration as compared with said natural frequency of said device, and a unidirectional mechanical transmission connecting said device and part so as to impart movement to said part upon deflection of said device in one direction but ineffective to impart movement thereto upon deflection of said device in an opposite direction.

6. A machine for stressing a specimen to be tested comprising means for applying a loading force to the specimen, a force measuring device, a member having a flattened O shape to provide two beam-like structures connected at their ends deflectable upon the application of a force thereto, each of said beam-like structures having connections for subjecting the same to the force applied to the specimen, a force indicating device having a part movable in accordance with the deflection of said structures for indicating the force applied to said specimen, and a string-like element having one end connected to said device and its other end operatively engaged with said force indicating part, said element being effective to impart movement to said part upon deflection of said structures in one direction but ineffective to impart such movement upon deflection in an opposite direction.

7. A tensile machine for stretching a specimen at a rapid rate, including a driving motor, drive means for transmitting a stretching force to said specimen by said motor, a substantially rigid force measuring device of flattened O-shape connected in series with the specimen, a relatively light force indicating lever having a frictionless yieldable pivot made of spring material, a string like element connecting said force measuring device to said lever and which is held taut by the inherent yielding effect of said pivot, said string like element merely deflecting as the result of high frequency vibration of said force measuring device without transmission of said vibrations to said force indicating lever.

8. A machine for applying a force to a specimen at a rapid rate, comprising, in combination, a driving motor, drive shaft means for transmitting a force to said specimen by said motor, a substantially rigid, looped, force measuring element connected in series with the specimen and drive shaft means, a low inertia stylus for indicating the force applied to said force measuring element, a drum cooperating with said stylus to record the stress-strain characteristics of said specimen and connected so as to rotate in accordance with the strain of said specimen, and a relatively short string like element secured to and interposed between said stylus and a loop portion of said force measuring element and which will deflect as the result of such high frequency vibration of the force measuring element that the stylus cannot follow thereby preventing the transmission of such high frequency vibration to the stylus, and resilient means for biasing said stylus so as to normally maintain said string like element taut.

9. A machine for stressing a specimen to be tested comprising means for applying a loading force to the specimen, a resilient force measuring device deflectable an amount proportional to the force applied thereto, a connection for subjecting said device to the force applied to said specimen, a movable force indicating part which is deflectable to indicate the force applied to said specimen, said part having a relatively low natural frequency of vibration as compared to that of said device, and a pull-resistant pressure-resilient link means mechanically connecting said device directly to said part by which said part will follow slow oscillating deflections of said device due to material flow in said specimen upon stressing thereof, but which will be ineffective to impart movement to said part upon rapid oscillating deflections of said device at its natural frequency due to breakage of the specimen.

10. A tensile machine for stretching a specimen including a resilient force measuring device, said device having mounting connections for subjecting it to the force applied to said specimen, a force indicating stylus, yieldable string-like means directly connecting said stylus to said measuring device effective to prevent the transmission to said stylus of high frequency vibrations of said device due to breakage of the specimen, said stylus having resilient means for normally maintaining said string-like means taut.

MICHAEL J. MANJOINE.
ARPAD NADAI.